(12) United States Patent
Sezaki (10) Patent No.: US 8,571,352 B2
(45) Date of Patent: Oct. 29, 2013

(54) DIFFERENCE IMAGE GENERATION DEVICE, DIFFERENCE IMAGE GENERATION METHOD, AND COMPUTER READABLE MEDIA

(75) Inventor: Isao Sezaki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 745 days.

(21) Appl. No.: 12/760,764

(22) Filed: Apr. 15, 2010

(65) Prior Publication Data

US 2010/0266221 A1 Oct. 21, 2010

(30) Foreign Application Priority Data

Apr. 17, 2009 (JP) .................................. 2009-100844

(51) Int. Cl.
*G06K 9/32* (2006.01)
*G06K 9/36* (2006.01)

(52) U.S. Cl.
USPC .......................................... 382/298; 382/286

(58) Field of Classification Search
USPC ......... 382/298, 293, 286, 273, 270, 190, 195, 382/217, 218
See application file for complete search history.

(56) References Cited

U.S. PATENT DOCUMENTS

| 5,086,484 | A | * | 2/1992 | Katayama et al. ............. 382/270 |
| 7,403,646 | B2 | | 7/2008 | Sato |
| 7,440,605 | B2 | | 10/2008 | Sasa et al. |
| 7,447,346 | B2 | | 11/2008 | Sato |
| 2004/0066962 | A1 | | 4/2004 | Sasa et al. |
| 2004/0081342 | A1 | * | 4/2004 | Sato .............................. 382/128 |
| 2007/0110307 | A1 | * | 5/2007 | Sato .............................. 382/169 |
| 2012/0154272 | A1 | * | 6/2012 | Hildreth ......................... 345/156 |

FOREIGN PATENT DOCUMENTS

| CN | 1496714 | 5/2004 |
| JP | 9-128534 | 5/1997 |
| JP | 2004-132721 | 4/2004 |
| JP | 2004-343176 | 12/2004 |

OTHER PUBLICATIONS

Notification of Reasons for Refusal mailed Feb. 5, 2013 by the Japanese Patent Office in corresponding Japanese Patent Application No. 2009-100844 with full English translation.
Chinese Office Action dated Apr. 19, 2013 in corresponding Chinese Patent Application No. 201010165307.9 with English translation of Chinese Office Action.
JP Office Action dated Apr. 23, 2013, with English translation; Application No. 2009-100844.

* cited by examiner

*Primary Examiner* — Yon Couso
(74) *Attorney, Agent, or Firm* — Young & Thompson (57) ABSTRACT

One exemplary embodiment includes a difference image generation device including a measurement unit and a scaling unit. The measurement unit measures a variation width of pixel values of a difference image signal obtained by performing subtraction processing on first and second input image signals. The scaling unit scales each pixel value of the difference image signal based on a measurement result of the variation width so that the difference image signal can be represented in grayscale using a predetermined bit width, and outputs a difference image signal subjected to scaling.

19 Claims, 5 Drawing Sheets

| | DIFFERENCE IMAGE SIGNAL DS1 | | VARIATION WIDTH OF DIFFERENCE | SHIFT AMOUNT | CORRECTION VALUE | DS3 SUBJECTED TO SCALING DS3 | |
|---|---|---|---|---|---|---|---|
| | MINIMUM VALUE | MAXIMUM VALUE | | | | MINIMUM VALUE | MAXIMUM VALUE |
| EXAMPLE 1 | -256 | 1023 | 1279 | 1 | +256 | 0 | 639 |
| EXAMPLE 2 | 256 | 1023 | 767 | 0 | -256 | 0 | 767 |
| EXAMPLE 3 | -256 | 512 | 768 | 0 | +256 | 0 | 768 |
| EXAMPLE 4 | 256 | 512 | 256 | 0 | -256 | 0 | 256 |

DIFFERENCE IMAGE GENERATION DEVICE, DIFFERENCE IMAGE GENERATION METHOD, AND COMPUTER READABLE MEDIA

INCORPORATION BY REFERENCE

This application is based upon and claims the benefit of priority from Japanese patent application No. 2009-100844, filed on Apr. 17, 2009, the disclosure of which is incorporated herein in its entirety by reference.

BACKGROUND

1. Field of the Invention

The present invention relates to a difference image generation device that generates an output image signal in which a difference between input image signals is reflected.

2. Description of Related Art

TOMITA (Japanese Unexamined Patent Application Publication No. 09-128534) discloses an image processing device which facilitates the image quality evaluation for evaluating image signals subjected to image processing. The device compares two input signals (an original image signal and a measured image signal) and generates an output image signal on which characterization processing is performed so as to enhance the difference between the two input signals. The measured image signal is obtained by performing some image processing on the original image signal. An example of the measured image signal is obtained by expanding a compressed original image signal.

More specifically, the device described in TOMITA generates the absolute value of the difference between the two input signals (the original image signal and the measured image signal) and compares the difference absolute value with a threshold. When the difference absolute value exceeds the threshold, the device multiplies the difference absolute value by a "multiplication coefficient", to thereby generate a difference absolute value signal. When the difference absolute value is equal to or smaller than the threshold, the value of the difference absolute value signal is zero. Note that the multiplication coefficient, which determines the magnitude of the difference absolute value signal, is specified by a user.

The device described in TOMITA then adds an "offset amount" to the difference absolute value signal, thereby generating a "characterizing image signal". The offset amount is also specified by the user. Lastly, when the value of the difference absolute value signal is zero, i.e., when the absolute value of the difference between the two input images is equal to or smaller than the threshold, the device selects one of the two input signals (e.g., the original image signal) and outputs the selected signal as the output image signal. Meanwhile, when the absolute value of the difference between the two input images exceeds the threshold, the characterizing image signal is output as the output image signal in place of the input image signal.

SUMMARY

The use of the image processing device disclosed by TOMITA makes it possible to obtain the output image signal in which the difference between two input signals is reflected. In the image processing device disclosed by TOMITA, however, the present inventor has found a problem as follows. Namely, it is necessary for a user to determine, by trial and error, adjustment parameters required for generating the output image signal in which the difference between the two input signals is reflected, which complicates the adjustment. That is, in the case of employing the image processing device disclosed by TOMITA, it is necessary for the user to determine set values for the "multiplication coefficient" and "offset amount" serving as the adjustment parameters, while visually checking a display screen obtained by supplying the output image signal of the device to a display device.

A difference image generation device according to a first exemplary aspect of the present invention includes a measurement unit and a scaling unit. The measurement unit measures a variation width of pixel values of a difference image signal obtained by performing subtraction processing on first and second input image signals. The scaling unit performs a scaling operation on each pixel value of the difference image signal based on a measurement result of the variation width so that the difference image signal can be represented in grayscale using a predetermined bit width, and outputs a difference image signal subjected to scaling.

A difference image generation method according to a second exemplary aspect of the present invention includes the steps of:
(a) measuring a variation width of pixel values of a difference image signal obtained by performing subtraction processing on first and second input image signals; and
(b) scaling each pixel value of the difference image signal based on a measurement result of the variation width so that the difference image signal can be represented in grayscale using a predetermined bit width.

A third exemplary aspect of the present invention relates to a tangible computer readable medium embodying instructions for causing a computer system to perform a difference image generation method. The method includes the steps of:
(a) measuring a variation width of pixel values of a difference image signal obtained by performing subtraction processing on first and second input image signals; and
(b) scaling each pixel value of the difference image signal based on a measurement result of the variation width so that the difference image signal can be represented in grayscale using a predetermined bit width.

According to the first to third exemplary aspects of the present invention, the output image signal in which the difference between at least two input signals is reflected can be automatically adjusted based on the variation width of pixel values of the difference image signal, the difference image signal being obtained by performing subtraction processing on the at least two input signals. This eliminates the need for a user to determine adjustment parameters (e.g., a multiplication coefficient and an offset amount as disclosed by TOMITA) by trial and error while visually checking a display screen, resulting in an improvement in the convenience of the user.

According to the first to third exemplary aspects of the present invention, it is possible to reduce the time and labor for a user to perform adjustment for the display of the output image signal by trial and error in the difference image generation device that generates the output image signal in which the difference between image signals is reflected, resulting in an improvement in the convenience of the user.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Exemplary embodiments of the present invention will be described in detail below with reference to the accompanying drawings. The same components are denoted by the same reference numerals throughout the drawings, and a repeated description thereof is omitted as appropriate to clarify the explanation.

[First Exemplary Embodiment]

A difference image generation device 1 according to a first exemplary embodiment of the present invention receives an original image signal S1 and a measured image signal S2, and generates an output image signal OS1 in which a difference between the two image signals S1 and S2 is reflected. The measured image signal S2 is generated by performing some image processing, such as sharpness (edge enhancement), gamma correction, or noise reduction, on the original image signal S1.

More specifically, the difference image generation device 1 calculates a difference between pixel values of pixels corresponding to the signals S1 and S2 to thereby generate a difference image signal DS1. Further, the difference image generation device 1 measures a variation width of pixel values of the difference image signal DS1, and automatically scales each pixel value of the difference image signal DS1 so that the difference image signal DS1 can be represented in grayscale using the bit width of the output image signal OS1.

For example, consideration is given to the case where the received image signals S1 and S2 and the output image signal OS1 have the same bit width of n bits. In this case, in order that the maximum variation width of the pixel values of the difference image signal DS1 is directly represented in grayscale, at least n+1 bits are required as the signal width of the difference image signal DS1. Considering that addition of an offset, for example, is carried out, n+2 bits are required as the signal width of the difference image signal DS1. Accordingly, in order that the maximum variation width of the difference image signal DS1 is represented in grayscale using the bit width (n bits) of the output image signal OS1, scaling is required to reduce one or two bits of the bit width of the difference image signal DS1. Meanwhile, when the variation width of the difference image signal DS1 is small enough to be represented by n-bit grayscale, it is better not to perform scaling so as to enhance the difference between the signals S1 and S2. Thus, the difference image generation device 1 determines the necessity of scaling based on the measurement result of the variation width of the difference image signal DS1, and the scaling is executed as needed.

Figure 1:
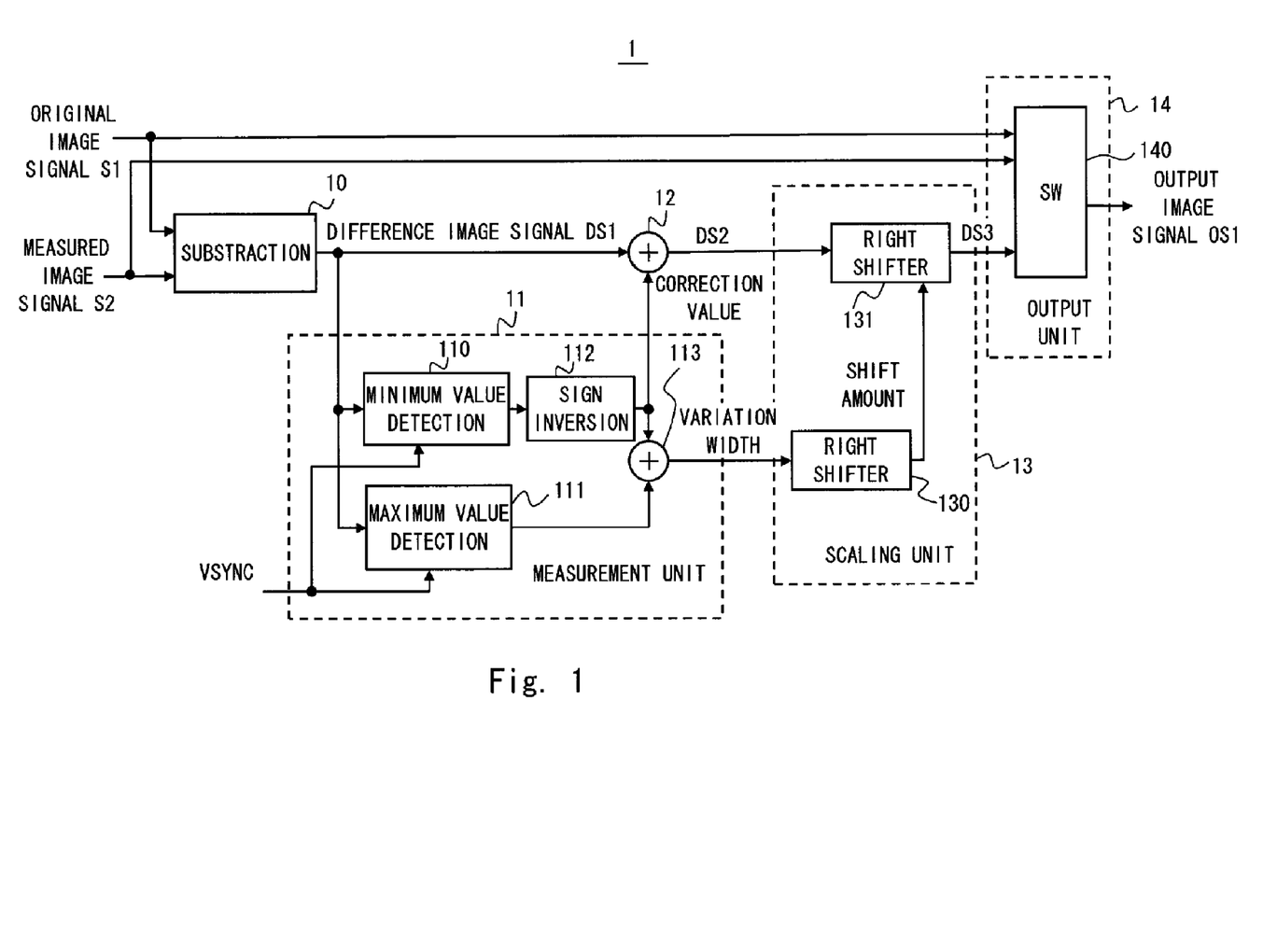
FIG. 1 is a block diagram showing an exemplary configuration of a difference image generation device according to a first exemplary embodiment of the present invention.

An exemplary configuration of the difference image generation device 1 will be described below with reference to FIG. 1. FIG. 1 is a block diagram showing an exemplary configuration of the difference image generation device 1. A subtraction unit 10 sequentially receives the pixel values of the signals S1 and S2 and performs subtraction processing on these pixel values, thereby generating the difference image signal DS1. The difference image signal DS1 is supplied to a measurement unit 11 and an addition unit 12. Note that the difference image signal DS1 can take a negative value. It is assumed that the negative value of the difference image signal DS1 is represented by two's complement.

The measurement unit 11 measures the variation width of pixel values of the difference image signal DS1. More specifically, the measurement unit 11 sequentially receives the difference image signal DS1 and detects a maximum value and a minimum value of the difference image signal DS1 within a predetermined signal range, thereby determining the variation width based on the difference between the maximum value and the minimum value. In an exemplary embodiment shown in FIG. 1, the measurement unit 11 repeats counting for each frame image, and detects the maximum value and the minimum value of the difference image signal DS1 for each frame image, thereby calculating the variation width of the difference image signal DS1.

At the start of each frame period (vertical blanking interval), a minimum value detection unit 110 starts operation using the maximum value, which can be taken by the difference image signal DS1, as an initial value. The minimum value detection unit 110 compares the pixel value (input value) of the sequentially received difference image signal DS1 with a hold value. When the input value is smaller than the hold value, the hold value is updated with the input value. The minimum value detection unit 110 performs the operation for one frame period, and outputs the hold value obtained at the end of one frame period, as the minimum value of the difference image signal DS1. In order to repeat the operation for each frame period, a vertical synchronizing signal (VSYNC) serving as a timing signal for defining one frame period may be supplied to the minimum value detection unit 110.

A maximum value detection unit 111 performs an operation similar to the above-mentioned operation of the minimum value detection unit 110, and outputs the maximum value of the difference image signal DS1 every frame period. The maximum value detection unit 111 may start operation using the minimum value, which can be taken by the difference image signal DS1, as the initial value, and may compare the sequentially received difference image signal (input value) with the hold value. When the input value is greater than the hold value, the hold value is updated with the input value.

A sign inversion unit 112 and an addition unit 113 calculate the variation width of the difference image signal DS1 for each frame period by subtracting the minimum value of the difference image signal DS1 from the maximum value thereof. Specifically, the sign inversion unit 112 inverts the sign of the minimum value of the difference image signal DS1. The addition unit 113 calculates the variation width of the difference image signal DS1 by adding the maximum value of the difference image signal DS1 to the minimum value of the difference image signal DS1 obtained after the sign inversion.

The addition unit 12 receives the difference image signal DS1 and a value obtained by inverting the sign of the minimum value of the difference image signal DS1 (the value is hereinafter referred to as "correction value"), which is measured for a frame image of a previous frame, and adds the two values. Specifically, the addition unit 12 applies an offset to the difference image signal DS1 so that the lower limit of the pixel value of the difference image signal DS1 becomes zero. A difference image signal DS2, which has been subjected to offset correction by the addition unit 12, is supplied to a scaling unit 13.

When the magnitude of the variation width of the difference image signal DS1 which is measured by the measurement unit 11 exceeds a magnitude which can be represented in grayscale using the bit width of the output image signal OS1, the scaling unit 13 performs scaling by performing a right bit shift on the difference image signal DS1 (specifically, the signal DS2 subjected to offset correction). In the exemplary configuration of FIG. 1, the scaling unit 13 includes right shifters 130 and 131. The right shifter 130 shifts rightward the variation width of the difference image signal DS1 by a predetermined number of bits, thereby determining a shift amount to be given to the difference image signal DS2 by the right shifter 131.

For example, consideration is given to the case where the output image signal OS1 has a bit width of n bits, and the variation width of the difference image signal DS1 has a bit width of n+1 bits. In this case, the input value (n+1 bits) of the variation width of the difference image signal DS1 may be shifted rightward by n bits. As a result, the (n+1)th bit of the variation width of the difference image signal DS1 appears in the least significant bit of the output of the right shifter 130, and thus the shift amount of the right shifter 131 can be determined.

The right shifter 131 shifts rightward the value of the difference image signal DS2, which has been subjected to offset correction, by the shift amount supplied from the right shifter 130. That is, the right shifter 131 scales the difference image signal DS2, which has been subjected to offset correction, to a magnitude that can be represented in grayscale using the bit width of the output image signal OS1. A difference image signal DS3 subjected to scaling is supplied to an output unit 14.

The output unit 14 includes a switch 140. The switch 140 selects a signal from among the two input image signals S1 and S2 and the difference image signal DS3 subjected to scaling, and outputs the selected signal as the output image signal OS1. The switch 140 may be configured to switch an output image between one of the input image signals S1 and S2 and the difference image signal DS3.

Figure 2:
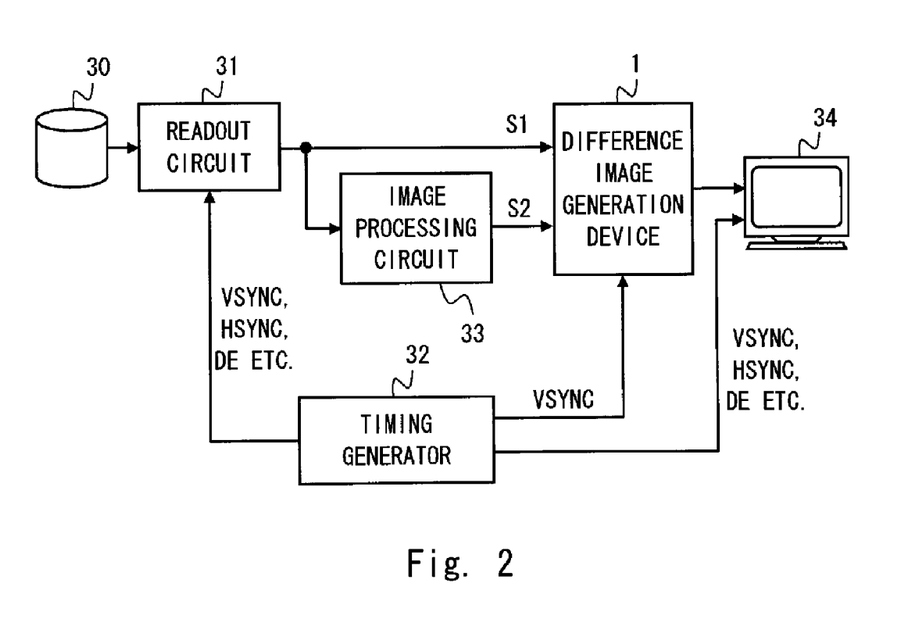
FIG. 2 is a block diagram showing a usage example of the difference image generation device according to the first exemplary embodiment.

As shown in FIG. 2, the output unit 14 capable of switching the output signal is effective when the difference image generation device 1 is disposed between an image processing circuit 33 and a display device 34. Referring to FIG. 2, a readout circuit 31 reads out original image data (original image signal S1) for each scan line from a storage device 30 based on synchronizing signals such as a vertical synchronizing signal (VSYNC), a horizontal synchronizing signal (HSYNC), and a data enable signal (DE) which are supplied from a timing generator 32. The image processing circuit 33 performs image processing on the original image signal S1, thereby generating the measured image signal S2. The display device 34 is, for example, a liquid crystal display or a CRT (Cathode Ray Tube) display. Meanwhile, when the difference image generation device 1 is used for the case where it is not necessary to switch the output image, there is no need to provide the output unit 14 capable of switching the output signal in the difference image generation device 1.

Figure 3:
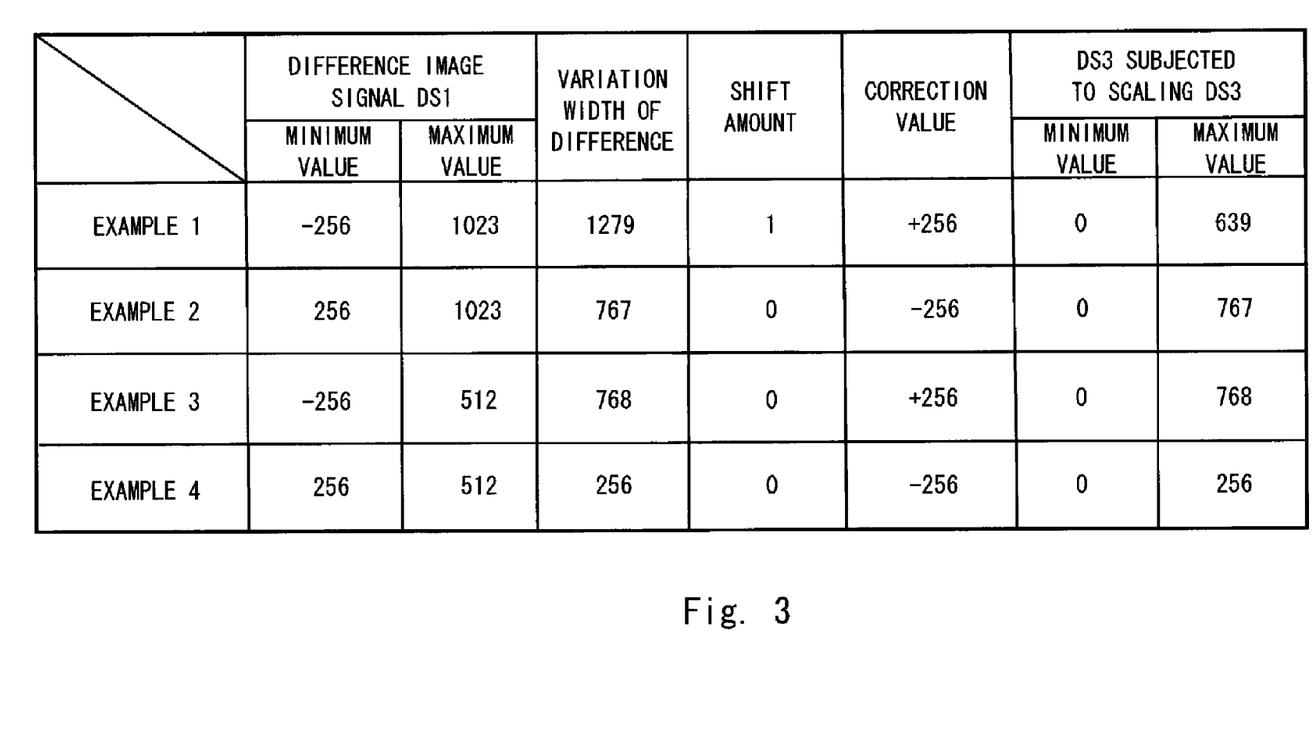
FIG. 3 is a table showing a specific example of the scaling for a difference image signal performed by the difference image generation device shown in FIG. 1.

Referring now to FIG. 3, a specific example of the scaling for the difference image signal will be described. For example, consideration is given to the case where the minimum value and the maximum value of the difference image signal DS1 are represented in decimal notation as "−256" and "1023", respectively, as shown in Example 1 of FIG. 3. In this case, the variation width of the difference therebetween is "1279". The variation width of the difference is represented in binary notation as "10011111111" using 11 bits. When the output image signal OS1 has a bit width of 10 bits, the maximum value of the variation width of the difference that can be represented in grayscale using the output image signal OS1 is "1023". For this reason, the right shifter 131 supplies the value "00000000001", which is obtained by shifting rightward the variation width of the difference by 10 bits, to the right shifter 131 as a right shift amount for scaling the difference image signal DS1. In Example 1 of FIG. 3, the correction value (offset value) supplied from the measurement unit 11 to the addition unit 12 is "+256". Thus, the difference image signal DS3 obtained after the scaling performed by the right shifter 131 has a minimum value of "0" and a maximum value of "639". Therefore, the variation width of the difference image signal DS3 can be represented in grayscale using the 10-bit output image signal OS1.

Examples 2 to 4 of FIG. 3 each show the case where the variation width of the difference image signal DS1 is small enough to be represented in grayscale using the output image signal OS1. In these examples, the shift amount determined by the right shifter 130 is "0", and therefore, the difference image signal DS2 subjected to offset correction is not to be scaled.

As described above, the difference image generation device 1 according to this exemplary embodiment automatically scales the difference image signal DS1 so that the variation width of the difference image signal DS1 can be appropriately represented in grayscale using the bit width of the output image signal. This eliminates the need for a user to determine, by trial and error, the necessity of an offset value or scaling, and improves the convenience of the user. Moreover, the scaling performed by the difference image generation device 1 prevents missing of information of pixels having a relatively large difference, which is generally estimated to be of high interest to the user, as compared with the case where limit processing is performed by a limiter.

[Second Exemplary Embodiment]

In the above-mentioned first exemplary embodiment, a description has been given of an example where the difference image signal DS1 is scaled by performing a right bit shift when the magnitude of the variation width of the pixel value of the difference image signal DS1 exceeds the magnitude that can be represented in grayscale using the predetermined bit width. In this exemplary embodiment, a description will be given of an example where the difference between the two input image signals S1 and S2 is enhanced by performing a left bit shift on the different image signal DS1, when the variation width of the pixel values of the difference image signal DS1 has a magnitude that can be represented in grayscale using a bit width (e.g., n−1 bits) smaller than the predetermined bit width (e.g., n bits).

Figure 4:
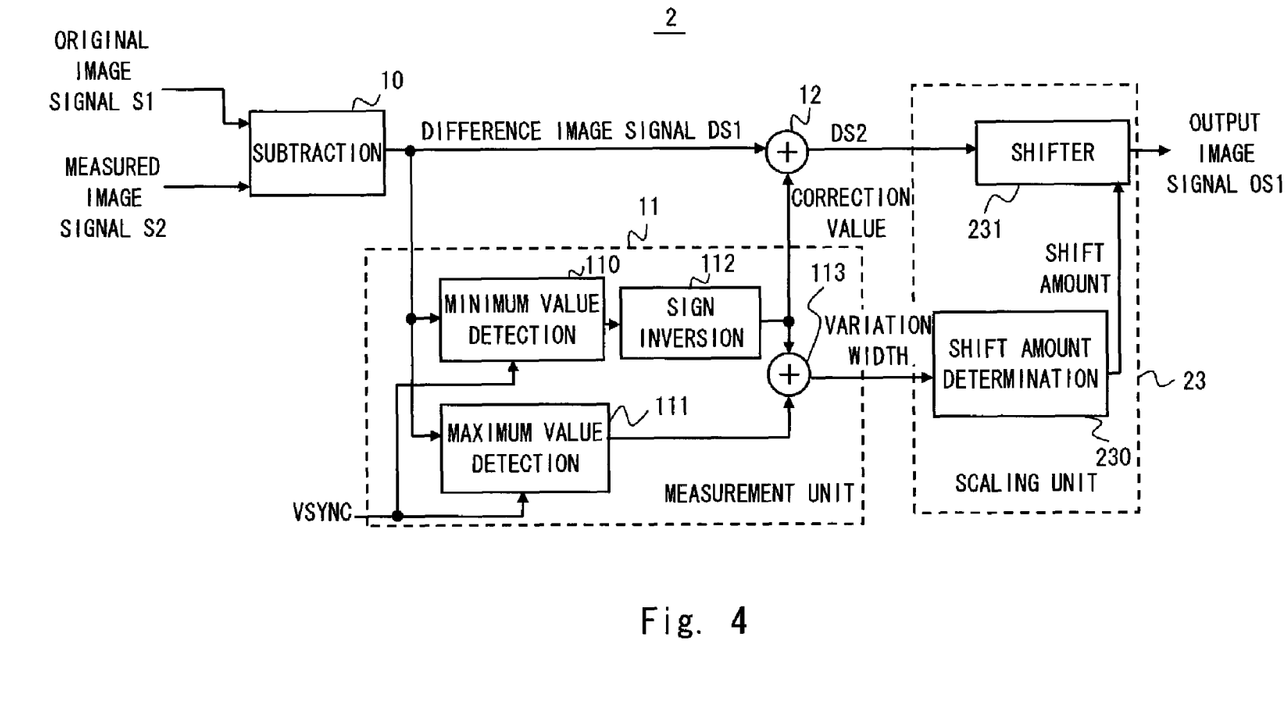
FIG. 4 is a block diagram showing an exemplary configuration of a difference image generation device according to a second exemplary embodiment of the present invention.

FIG. 4 is a block diagram showing an exemplary configuration of a difference image generation device 2 according to this exemplary embodiment. The configuration and operation of each of the subtraction unit 10, the measurement unit 11, and the addition unit 12, which are shown in FIG. 4, are similar to those of the first exemplary embodiment, so a description thereof is omitted. Like the scaling unit 13 described above, a scaling unit 23 performs scaling (right shift) in a bit-width decreasing direction, as well as scaling (left shift) in a bit-width increasing direction when the variation width of the difference image signal DS1 is small.

A shift amount determination unit 230 determines a shift amount used when a shifter 231, which is described later, performs a right shift or a left shift on the difference image signal DS2 subjected to offset correction. Specifically, consideration is given to the case where the two input image signals S1 and S2 and the output image signal OS1 have a bit width of n bits and the variation width of the difference image signal DS1 has a bit width of n+1 bits. In this case, the shift amount determination unit 230 may refer to values of two bits in total, i.e., the (n+1)th bit and the n-th bit, of the input value (n+1 bits) of the variation width of the difference image signal DS1. When the value of the (n+1)th bit is "1", the shift amount determination unit 230 may indicate a shift amount corresponding to one-bit right shift. On the other hand, when the value of each of the (n+1)th bit and the n-th bit of the variation width of the difference image signal DS1 is zero, the shift amount determination unit 230 may indicate a shift amount corresponding to one-bit left shift.

The shift amount determination unit 230 may instruct the shifter 231 to perform a left shift by two or more bits. In this case, the shift amount determination unit 230 may be configured to refer to the higher-order three bits of the variation width of the difference image signal DS1.

The shifter 231 performs scaling by performing a right bit shift or a left bit shift on the difference image signal DS2, which has been subjected to offset correction, based on the shift amount supplied from the shift amount determination unit 230.

As described in this exemplary embodiment, when the variation width of the difference image signal DS1 has a magnitude that can be represented in grayscale using a bit width (e.g., n−1 bits) smaller than the predetermined bit width (e.g., n bits), a left bit shift is performed on the difference image signal DS1, thereby making it possible to enhance the difference between the two input image signals S1 and S2.

Incidentally, various processing performed by the difference image generation devices 1 and 2 (e.g., subtraction processing with the subtraction unit 10, measurement of the variation width of the difference image signal DS1 with the measurement unit 11, and scaling with the scaling units 13 and 23) may be achieved by causing a computer, such as a CPU (Central Processing Unit), an MPU (Micro Processing Unit), or a DSP (Digital Signal Processor), to execute a program.

Figure 5:
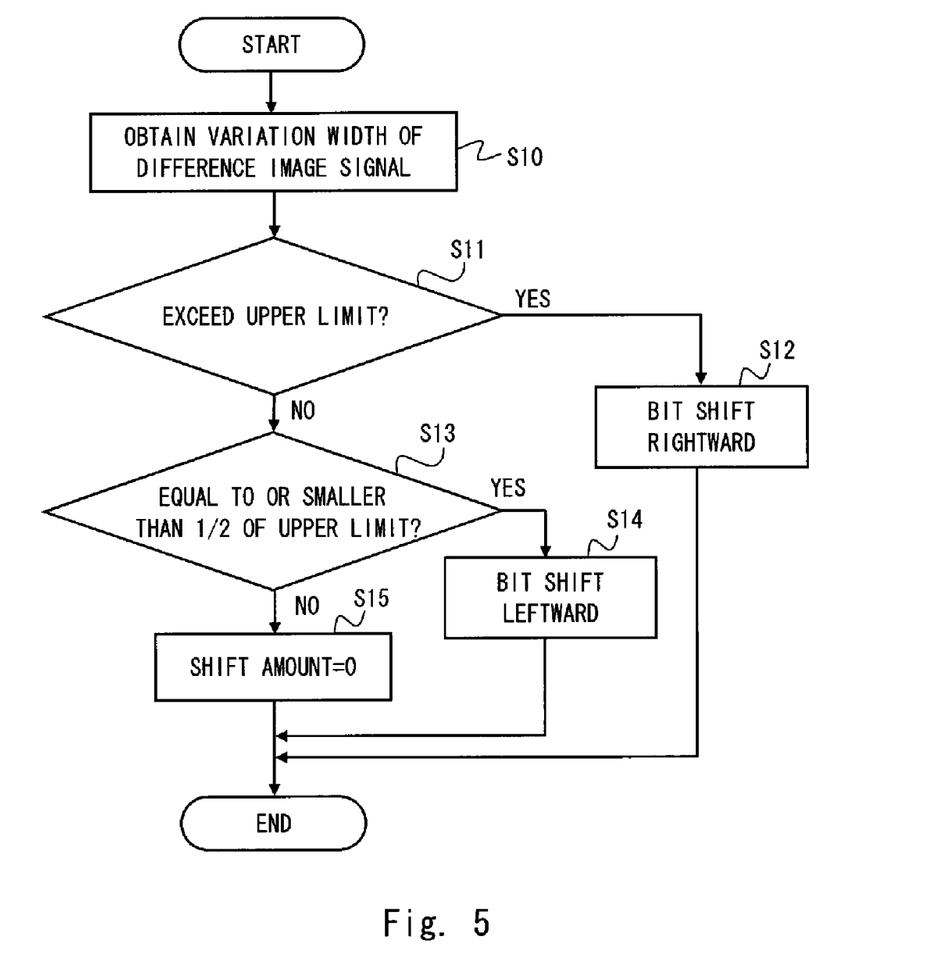
FIG. 5 is a flowchart showing a specific example of a scaling procedure.

For example, a description is given of a procedure for causing a computer to execute the processing of the scaling unit 23 described in the second exemplary embodiment. FIG. 5 is a flowchart showing a scaling procedure. In Step S10, the computer obtains the variation width of the difference image signal DS1 generated by the measurement unit 11. In Step S11, the computer determines whether the variation width of the difference image signal DS1 exceeds a predetermined upper limit. The upper limit may be determined according to the bit width of the output image signal OS1. When the variation width of the difference image signal DS1 exceeds the predetermined upper limit (YES in Step S11), the computer shifts the difference image signal DS1 (or the difference image signal DS2 subjected to offset correction) rightward by one bit (Step S12).

Meanwhile, when the variation width of the difference image signal DS1 is equal to or smaller than the predetermined upper limit (NO in Step S11), the computer determines whether the variation width of the difference image signal DS1 is equal to or smaller than ½ of the predetermined upper limit (Step S13). When the variation width of the difference image signal DS1 is equal to or smaller than ½ of the predetermined upper limit (YES in Step S13), the computer shifts the difference image signal DS1 (or the difference image signal DS2 subjected to offset correction) leftward by one bit (Step S14).

When the variation width of the difference image signal DS1 is greater than ½ of the predetermined upper limit and is equal to or smaller than the upper limit (NO in Step S13), the computer sets the shift amount to zero (Step S15), and no scaling is performed on the difference image signal DS1 (or the difference image signal DS2 subjected to offset correction).

[Other Exemplary Embodiments]

In the above-mentioned first and second exemplary embodiments, a description has been given of the example where the necessity of scaling for a subsequent frame image is determined based on the measurement result of the variation width of the difference image signal DS1 in an image of a previous frame. Alternatively, the necessity of scaling for each frame image may be determined based on the measurement result of the variation width of the difference image signal DS1 in its own frame image. To achieve this, a buffer memory capable of storing the difference image signal DS1 for one frame may be disposed between the subtraction unit 10 and the addition unit 12. This configuration makes it possible to accurately determine the necessity of scaling for each frame image.

Moreover, the measurement unit 11 described in the first and second exemplary embodiments may be configured to measure the variation width of the difference image signal DS1 for two or more frame images. This configuration makes it possible to measure the variation width of the difference image signal DS1 more accurately and to improve the precision of scaling.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A difference image generation device comprising:
   a measurement unit that measures a variation width of pixel values of a difference image signal obtained by performing subtraction processing on first and second input image signals; and
   a scaling unit that performs a scaling operation on each pixel value of the difference image signal based on a measurement result of the variation width so that the difference image signal can be represented in grayscale using a predetermined bit width, and outputs a difference image signal subjected to the scaling;
   wherein the measurement unit calculates the variation width based on a maximum value and a minimum value of the difference image signal measured within a predetermined signal range of the first and second input image signals.

2. The difference image generation device according to claim 1, wherein the measurement unit is configured to measure the variation width in at least one frame image of the first and second input image signals.

3. The difference image generation device according to claim 2, wherein
   each of the first and second input image signals includes a sequence of frame images, and
   the scaling unit is configured to perform the scaling operation by applying the measurement result of the variation width to a frame image subsequent to the at least one frame image in which the variation width is measured.

4. The difference image generation device according to claim 2, wherein the measurement unit measures the variation width for a measurement period of two or more frame images.

5. The difference image generation device according to claim 2, wherein
the measurement unit measures the variation width for each frame image, and
the scaling unit performs the scaling operation for each frame image based on the measurement result of the variation width for each frame image obtained by the measurement unit.

6. The difference image generation device according to claim 1, wherein, when the variation width of the difference image signal exceeds a magnitude that can be represented in grayscale using the predetermined bit width, the scaling unit performs a right bit shift on the difference image signal.

7. The difference image generation device according to claim 1, wherein, when the variation width of the difference image signal has a magnitude that can be represented in grayscale using a bit width smaller than the predetermined bit width, the scaling unit performs a left bit shift on the difference image signal.

8. The difference image generation device according to claim 1, further comprising an addition unit that adds an offset based on a minimum value of the difference image signal to each of the pixel values of the difference image signal so that a minimum value of the difference image signal subjected to the scaling becomes zero.

9. A difference image generation method comprising:
measuring, by a measurement unit, a variation width of pixel values of a difference image signal obtained by performing subtraction processing on first and second input image signals; and
scaling, by a scaling unit, each pixel value of the difference image signal based on a measurement result of the variation width so that the difference image signal can be represented in grayscale using a predetermined bit width;
wherein the measuring includes calculating the variation width based on a maximum value and a minimum value of the difference image signal measured within a predetermined signal range of the first and second input image signals.

10. The method according to claim 9, wherein the measurement of the variation width is performed for at least one frame image of the first and second input image signals.

11. The method according to claim 10, wherein
each of the first and second input image signals includes a sequence of frame images, and
the scaling comprises scaling a subsequent frame image based on a measurement result of the variation width for a previous frame image.

12. The method according to claim 10, wherein the measurement is performed for a measurement period of two or more frame images.

13. The method according to claim 9, wherein the scaling comprises performing a right bit shift on the difference image signal when the variation width of the difference image signal exceeds a magnitude that can be represented in grayscale using the predetermined bit width.

14. The method according to claim 9, wherein the scaling comprises performing a left bit shift on the difference image signal when the variation width of the difference image signal has a magnitude that can be represented in grayscale using a bit width smaller than the predetermined bit width.

15. The method according to claim 9, further comprising adding an offset based on a minimum value of the difference image signal to each of the pixel values of the difference image signal so that a minimum value of the difference image signal subjected to the scaling becomes zero.

16. A tangible computer readable medium embodying instructions for causing a computer system to perform a difference image generation method, the method comprising:
measuring a variation width of pixel values of a difference image signal obtained by performing subtraction processing on first and second input image signals; and
scaling each pixel value of the difference image signal based on a measurement result of the variation width so that the difference image signal can be represented in grayscale using a predetermined bit width;
wherein the measuring includes calculating the variation width based on a maximum value and a minimum value of the difference image signal measured within a predetermined signal range of the first and second input image signals.

17. The difference image generation device according to claim 1, wherein the second image signal is obtained by image processing of the first image signal.

18. The method according to claim 9, wherein the second image signal is obtained by image processing of the first image signal.

19. The tangible computer readable medium according to claim 16, wherein the second image signal is obtained by image processing of the first image signal.

* * * * *